United States Patent
Li et al.

(10) Patent No.: US 8,406,290 B2
(45) Date of Patent: Mar. 26, 2013

(54) USER SENSITIVE INFORMATION ADAPTIVE VIDEO TRANSCODING FRAMEWORK

(75) Inventors: Ruijia Li, Shanghai (CN); Chun Xi Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1172 days.

(21) Appl. No.: 10/583,053

(22) PCT Filed: Dec. 28, 2005

(86) PCT No.: PCT/CN2005/002331
§ 371 (c)(1),
(2), (4) Date: Jun. 14, 2006

(87) PCT Pub. No.: WO2007/073616
PCT Pub. Date: Jul. 5, 2007

(65) Prior Publication Data
US 2009/0268808 A1    Oct. 29, 2009

(51) Int. Cl.
*H04N 7/12* (2006.01)
*H04N 11/02* (2006.01)
*H04N 11/04* (2006.01)
*G11B 15/14* (2006.01)
*G06K 9/36* (2006.01)
*G06K 9/46* (2006.01)
*G06F 15/16* (2006.01)

(52) U.S. Cl. ............... 375/240.02; 375/240.08; 360/64; 382/239; 709/247

(58) Field of Classification Search .............. 375/240.02
See application file for complete search history.

(56) References Cited

U.S. PATENT DOCUMENTS

| 5,493,456 A * | 2/1996 | Augenbraun et al. ........ 360/64 |
| 5,612,900 A * | 3/1997 | Azadegan et al. ........... 709/247 |
| 6,356,664 B1 * | 3/2002 | Dunn et al. .................... 382/239 |
| 6,490,320 B1 * | 12/2002 | Vetro et al. ............. 375/240.08 |
| 2002/0141498 A1 | 10/2002 | Martins et al. |
| 2002/0157112 A1 * | 10/2002 | Kuhn ............................. 725/113 |

(Continued)

FOREIGN PATENT DOCUMENTS

| CN | 1407808 | 4/2003 |
| CN | 1420690 A | 5/2003 |

(Continued)

OTHER PUBLICATIONS

Office Action from foreign counterpart German Patent File No. 11 2005 003 791.6-55 mailed Oct. 16, 2009, 8 pages (Translation included).

(Continued)

*Primary Examiner* — Christopher S Kelley
*Assistant Examiner* — Hee-Yong Kim
(74) *Attorney, Agent, or Firm* — Blakely, Sokoloff, Taylor & Zafman LLP

(57) ABSTRACT

A video system includes a sensitive-information generator to generate a definition of sensitive information parts (SIP) areas. The video system also includes a transcoder to transcode the SIP areas at a higher bit rate than non-SIP areas in the frames based on bandwidth available for transmitting the transcoded frames. The SIP areas are generated statically or dynamically. The video system adapts to various network conditions and utilizes the bandwidth efficiently to deliver the sensitive information of high quality and to enhance the user experience.

8 Claims, 4 Drawing Sheets

U.S. PATENT DOCUMENTS

2005/0125832 A1    6/2005    Jost et al.
2005/0182855 A1    8/2005    Apostolopoulos et al.

FOREIGN PATENT DOCUMENTS

| | | |
|---|---|---|
| EP | 1 248 466 | 10/2002 |
| EP | 1 313 322 A2 | 4/2003 |
| WO | WO 01/50416 A2 | 7/2001 |
| WO | WO 01/69936 A2 | 9/2001 |

OTHER PUBLICATIONS

Translation of First Office Action from foreign counterpart China Patent Application No. 200580052395.9, mailed Dec. 18, 2009, 10 pages.

Examination Report Office Action from foreign counterpart Great Britain Application No. GB0806849.6, mailed Jun. 22, 2010, 3 pages.

Examination Report Office Action from foreign counterpart Great Britain Application No. GB0806849.6, mailed Jan. 14, 2011, 2 pages.

Office Action from foreign counterpart German Application No. 0806849.6 mailed Mar. 14, 2011, 10 pages.

First Office Action from foreign counterpart China Application No. 200580052395.9 mailed Dec. 18, 2009, 15 pages.

Second Office Action from foreign counterpart China Application No. 200580052395.9 mailed Jul. 1, 2010, 6 pages.

Third Office Action from foreign counterpart China Application No. 200580052395.9 mailed May 25, 2011, 10 pages.

Office Action from foreign counterpart Great Britain Application No. GB0806849.6, mailed May 25, 2011, 2 pages.

Notice of Allowance from foreign counterpart Great Britain Application No. GB0806849.6, mailed Jun. 14, 2011, 2 pages.

Office Action from foreign counterpart German Patent Application No. 0806849.6, mailed Aug. 22, 2012, 19 pages.

Office Action from foreign counterpart Chinese Patent Application No. 200580052395.9, mailed Mar. 20, 2012, 11 pages.

* cited by examiner

USER SENSITIVE INFORMATION ADAPTIVE VIDEO TRANSCODING FRAMEWORK

CROSS-REFERENCE TO RELATED APPLICATION

This application is a National Phase application of, and claims priority to, International Application No. PCT/CN2005/002331, filed Dec. 28, 2005, entitled A NOVEL USER SENSITIVE INFORMATION ADAPTIVE VIDEO TRANSCODING FRAMEWORK.

BACKGROUND

Transcoding refers to the conversion of one digital file to another. The conversion includes, but is not limited to, format change, resolution change, and bit rate change. In video-on-demand applications, a host computer may respond to a user's request to view a stored video file. The host computer may transcode the stored video file to an appropriate video format and bit rate for transmission through a network to the user. The transcoded format may be compatible with the user's platform, e.g., a television or a personal computer. The host computer may also adjust the transmission bit rate to meet the bandwidth requirement of the network connecting the host and the user.

Network connection between the host and the user may sometimes be unstable or congested. Video transmission on a wireless connection such as wireless fidelity (WiFi) network is especially susceptible to data loss and errors. Thus, the transcoder on the host usually reduces transmission bit rate to protect against such network conditions. However, a reduced bit rate typically degrades the quality of the video received by the user.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
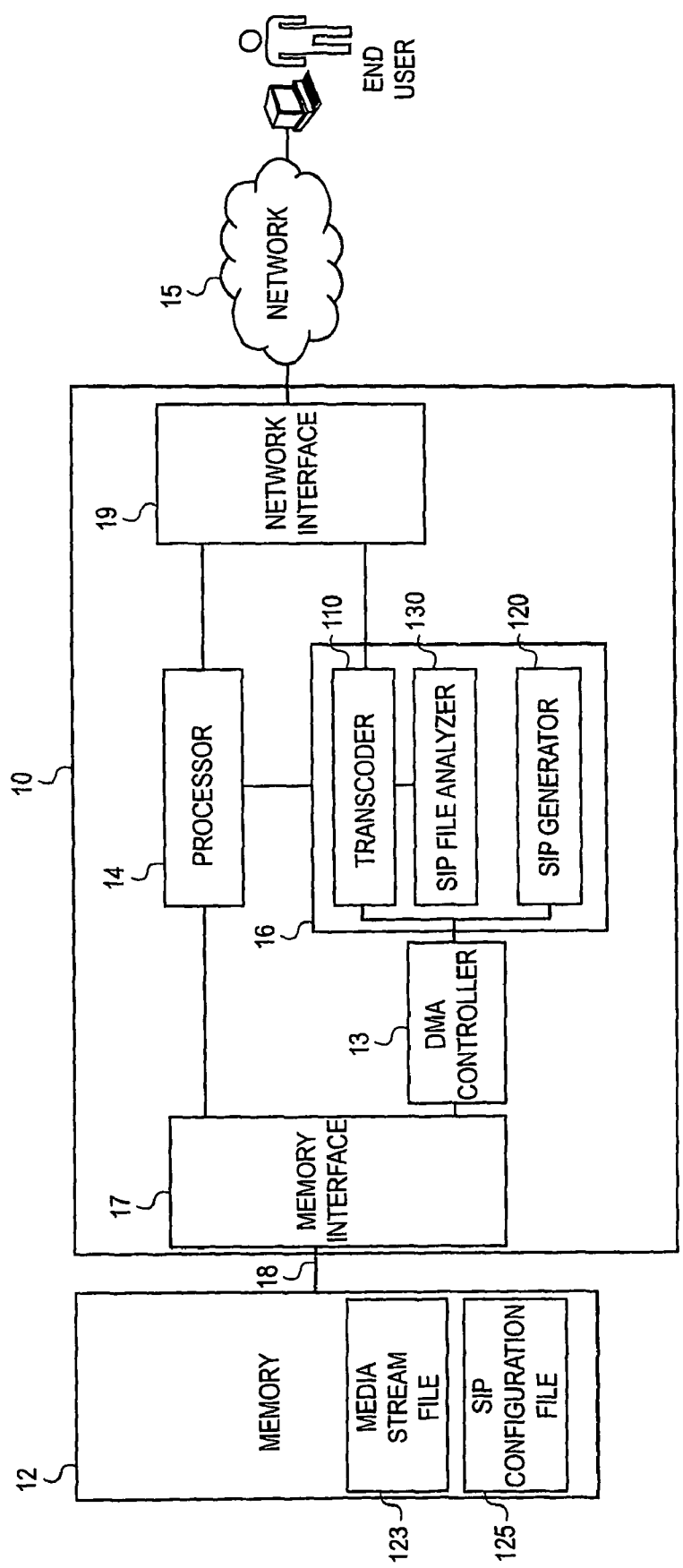
FIG. 1 is a block diagram of an embodiment of a video system.

FIG. 1 shows a block diagram of an embodiment of a video system 10. Video system 10 may be a personal computer, a file server, or any computing device having video transcoding capabilities. In one embodiment, video system 10 may be a video-on-demand (VOD) system that transmits a video stream to an end user through a network in response to the user's request. Video system 10 may be coupled to a memory 12 through a memory interface 17 and a memory path 18. Video system 10 may also be coupled to a network 15 through a network interface 19 for transmitting video streams to an end user. Network 15 may be a wire-lined, wireless network, or a combination of both. Network 15 may be a local area network, a wide area network, the Internet, or a combination of all of the above. Memory 12 may be a combination of one or more of volatile or non-volatile memory devices, or any machine-readable medium. For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, or digital signals).

Figure 2:
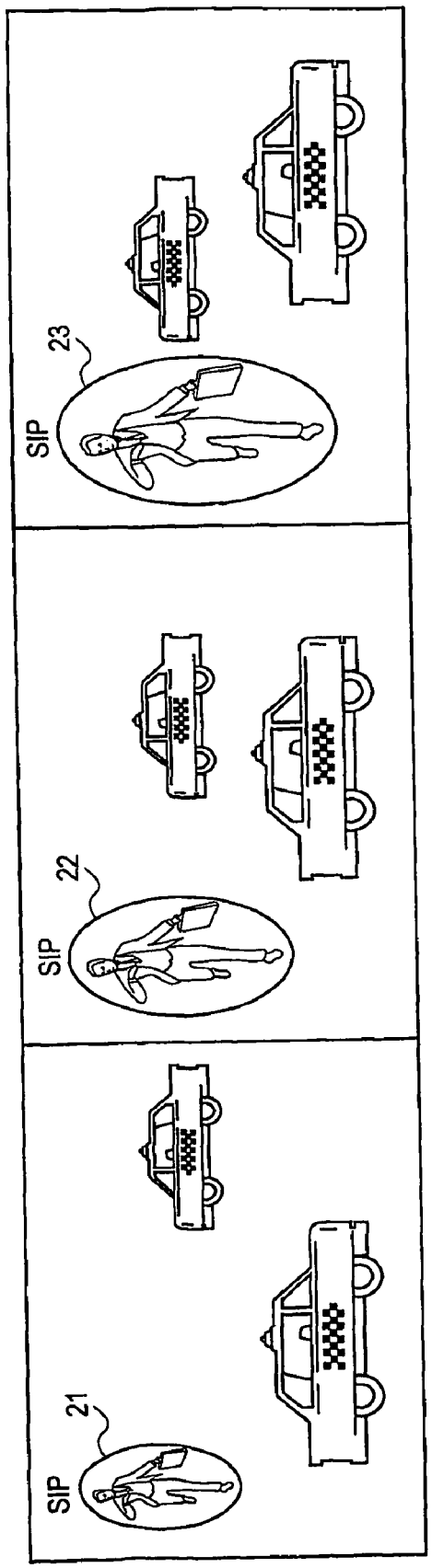
FIG. 2 is an example of a frame sequence including three frames.

Memory 12 may store a plurality of video files, including a media stream file 123, in one or more video formats. Media stream file 123 may include a sequence of frames. Part of each frame may contain information of particular interest or sensitive to a user. For example, FIG. 2 shows three consecutive frames, each of which includes a running person and two moving cars. The user may be more interested in the person than in the cars, and therefore may pay close attention to the details of the person. Thus, the user may designate the person as an object containing user sensitive information. The areas containing the person, as indicated by ellipses 21-23, are referred to as sensitive information parts (SIP) areas. The areas outside of the SIP areas are referred to as non-SIP areas.

Referring to FIG. 1, in one embodiment, video system 10 may have a transcoding unit 16 comprising transcoder 110, a sensitive information parts (SIP) generator 120, and an optional SIP file analyzer 130, for applying a biased rate control to the video files. In one embodiment, transcoder 110 may assign more bits per macroblock (e.g., a 16-pixel by 16-pixel bock) to the SIP area than to the non-SIP area, thereby enhancing the quality of the SIP and the user experience. SIP generator 120 generates the SIP information for each frame. The SIP information may be generated concurrently with the transmission of the transcoded stream, or generated statically into a SIP configuration file 125 stored in memory 12. If the SIP information is generated offline and stored in SIP configuration file 125, the format of the SIP configuration file may not be readily compatible with transcoder 110. SIP file analyzer 130 may be used to convert the file format for transcoder 110 to resolve any format incompatibility.

In FIG. 1, transcoder 110, SIP generator 120, and SIP file analyzer 130 are shown as hardware devices, which may be implemented by Application-Specific Integrated Circuit (ASIC), Field Programmable Gate Array (FPGA), or any hardware technology suitable for logic device implementation. These hardware devices may have direct access to the files in memory 12 through a direct memory access (DMA) controller 13. Alternatively, one or more of transcoder 110, SIP generator 120, and SIP file analyzer 130 may be implemented as software modules stored in a machine-readable medium, which is previously defined. These software modules may contain instructions executable by a processor 14.

In a static embodiment, the SIP may be generated under the directions of a user. For example, a user may manually mark one or more SIP areas for each frame and assign each of the marked areas a priority. SIP generator 120 may generate the coordinates of each marked area and save them in SIP configuration file 125. Alternatively, a user may mark the SIP in the frame in which the SIP first appears. SIP generator 120 may use the marked information to automatically locate the SIPs in the frames that follow. For example, referring to FIG. 2, a user may manually mark ellipses 21-23 to indicate that the running person contains the sensitive information. The user may alternatively mark ellipse 21 only. SIP generator 120 may analyze characteristics of the object (the running person) or the area contained in ellipse 21 and search for objects or areas having the same or similar characteristics in the succeeding frames. SIP generator 120 may utilize standard functions such as those described in the Moving Picture Experts Group-4 (MPEG-4) for the analysis and search. When SIP generator 120 locates an object or an area, the SIP generator may generate a mark, in the shape of an ellipse or any suitable shapes, to encircle it. The coordinates of the marks, whether generated by the user or SIP generator 120, may be stored in SIP configuration file 125. SIP configuration file 125 may store each SIP in the form of an item that includes a frame sequence number, a SIP number, a SIP priority, and the shape and coordinates of the mark encircling the SIP.

The user may alternatively indicate to SIP generator 120 that an object (e.g., the running person) is the SIP without encircling the object. In this scenario, the user may describe characteristics of the object (e.g., an object of a certain color or a certain height-to-width ratio) to SIP generator 120. The user may alternatively specify an area of fixed coordinates and shape as the SIP area. SIP generator 120 may follow the user's directions to locate the objects or the areas in all of the frames.

SIP generator 120 may also locate the SIP automatically without the directions from a user or with minimal input from a user. For example, a user may provide a priority for each of the frequently appearing objects. SIP generator 120 may compare the objects in a frame sequence and designate the objects that appear the most frequently and/or have the highest priorities as the SIP. Alternatively, SIP generator 120 may compare the objects in a sequence of frames and designate the objects that appear in the most central location of the frames as the SIP. In another scenario, SIP generator 120 may compare the intersected areas in a frame sequence and designate the areas that appear the most frequently as the SIP.

Figure 3:
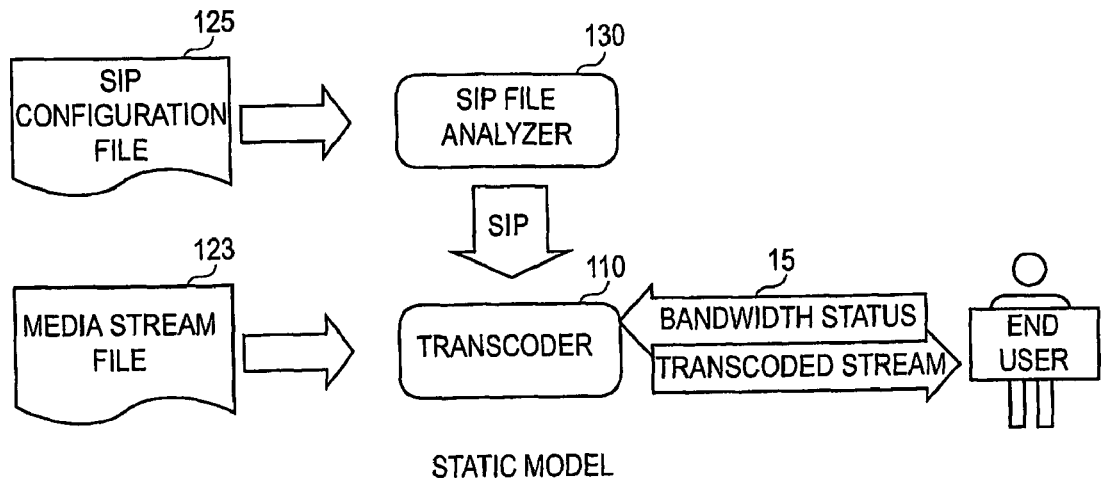
FIG. 3 is a block diagram of a static model of the video system.
Figure 4:
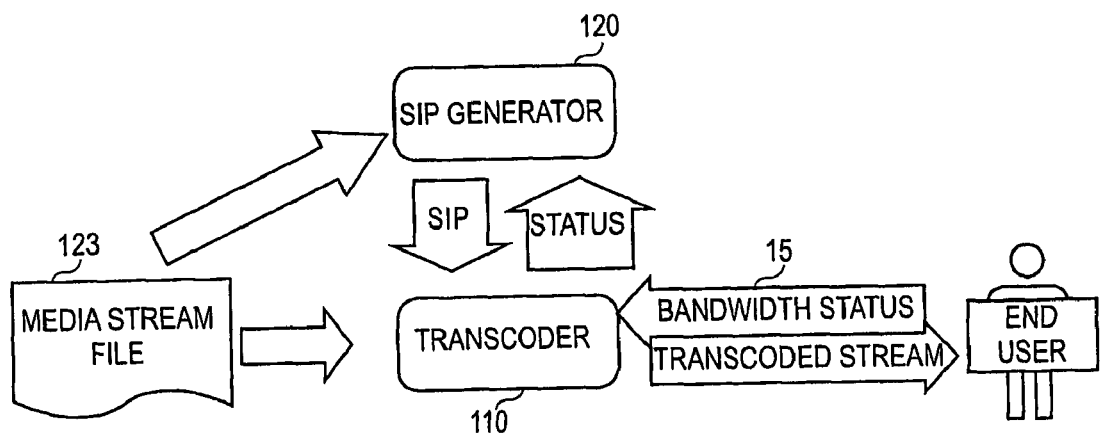
FIG. 4 is a block diagram of a dynamic model of the video system.

In some embodiments, video system 10 of FIG. 1 may be implemented by a static model or a dynamic model. FIG. 3 and FIG. 4 illustrate embodiments of a static model and a dynamic model of video system 10, respectively. In both of the static and dynamic models, transcoder 110 may transcode media stream file 123 based on the SIP information and the available bandwidth of network 15. Transcoder 110 may determine a different bit rate for the SIP and non-SIP areas to ensure that the quality of SIP is not compromised by the limited bandwidth. The SIP area may be transmitted at a higher bit rate than the non-SIP area. If the available bandwidth is low or if network 15 is unstable, transcoder 110 may reduce the bit rate for transmitting the non-SIP area but maintain the bit rate for transmitting the SIP area. Transcoder 110 may alternatively reduce the bit rates for both the SIP and non-SIP areas but apply a higher bit reduction rate to the non-SIP area. To conserve more bandwidth for the high-priority SIPs, some of the low-priority SIP areas may be discarded. That is, the low-priority SIP areas may be encoded with the same bit rate as the non-SIP areas. Thus, video system 10 may adapt to various network conditions and utilize the bandwidth efficiently to deliver the sensitive information of high quality.

In the static model of FIG. 3, SIP configuration file 125 is generated prior to the transmission of the transcoded video. SIP configuration file 125 may be imported from a different platform and may have a format not readily interpretable by transcoder 110. SIP file analyzer 130 may read SIP configuration file 125 and convert the file format to another format compatible with transcoder 110. Transcoder 110 may then generate a transcoded stream from media stream file 123 based on the SIP received from SIP file analyzer 130 and the bandwidth status of network 15.

In the dynamic model of FIG. 4, SIP configuration file 125 and SIP file analyzer 130 may be dispensed with. SIP generator 120 generates the SIP information concurrently with the transcoding operations and directly sends the SIPs to transcoder 110. In one embodiment, transcoder 110 may feed the bandwidth status of network 15 to SIP generator 120, allowing the SIP generator to dynamically adjust the amount of SIP generated based on the network condition.

Figure 5:
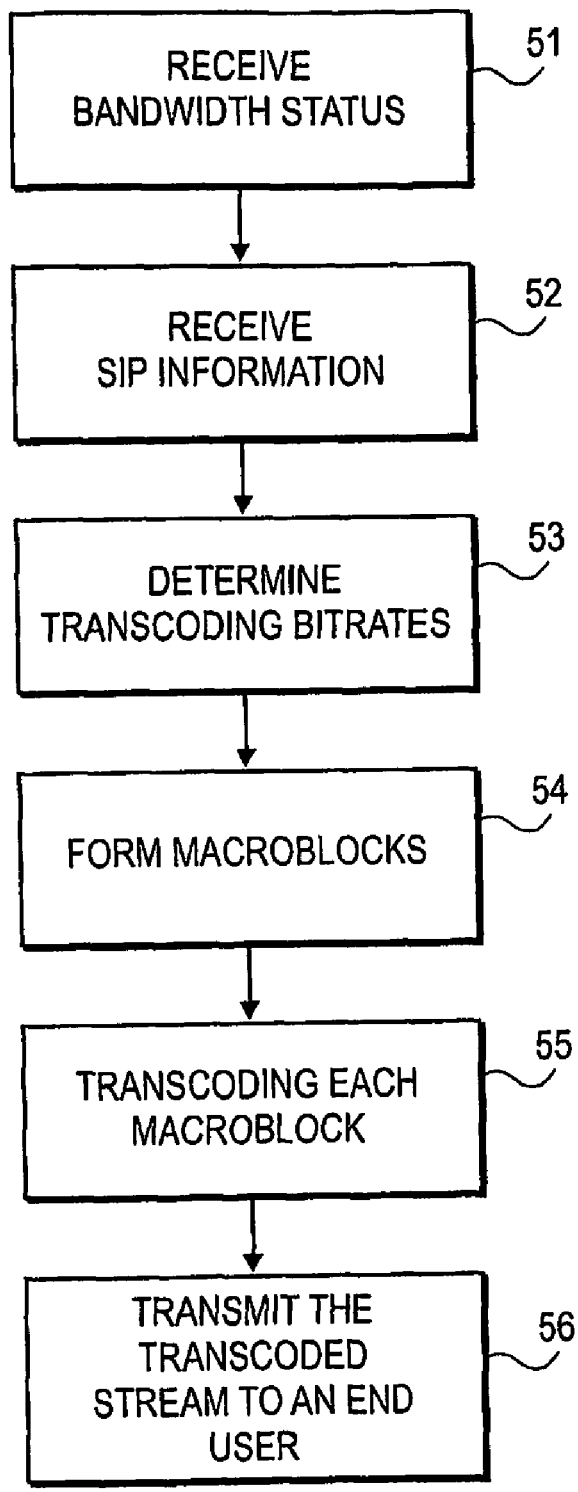
FIG. 5 is a flowchart showing operations of a transcoder of the video system.

FIG. 5 is a flowchart illustrating an example of the operations of a transcoder in some embodiments, e.g., transcoder 110 of FIG. 1. At block 51, transcoder 110 receives a bandwidth status indicating the available bandwidth for transmitting the transcoded video. At block 52, according to the static model of FIG. 3, transcoder 110 receives SIP information from SIP file analyzer 130. Alternatively, according to the dynamic model of FIG. 4, transcoder 110 receives SIP information from SIP generator 120 and forwards the bandwidth status to the SIP generator. Although the SIP information as shown is received after the reception of the bandwidth status, the reception may be in any order and may be concurrent. At block 53, based on the bandwidth status, transcoder 110 determines the bit rates to transcode the SIP and the non-SIP areas. Transcoder 110 may also determine whether to discard the SIP having low priority. At block 54, transcoder 110 forms macroblocks approximating the marked areas or objects. At block 55, transcoder 110 transcodes each of the macroblocks in the SIP areas with a higher bit rate than in the non-SIP areas. At block 56, transcoder transmits the transcoded stream to an end user through network 15.

In the foregoing specification, specific embodiments have been described. It will, however, be evident that various modifications and changes can be made thereto without departing from the broader spirit and scope of the appended claims. The specification and drawings are, accordingly, to be regarded in an illustrative rather than a restrictive sense.

What is claimed is:

1. A method comprising:
receiving from a viewer of a video, a definition of a first part of a frame that contains sensitive information, said definition made by said viewer on said video through a graphical user interface, wherein the frame includes the first part and a second part, and additionally receiving from the viewer different sensitive information priority levels for different areas of the frame identified by the viewer;
transcoding the first part of the frame at a higher bit rate than the second part of the frame based on bandwidth available for transmitting the transcoded frame such that the transcoding further includes:
detecting first network congestion;
in response to the detecting of the first network congestion, reducing the bit rate of the second part of the frame while maintaining the bit rate of the first part of the frame;
detecting second network congestion;
in response to the detecting of the second network congestion, reducing the bit rates of the first and second parts of the frame wherein the bit rate of the second part of the frame is reduced more than the bit rate of the first part of the frame is reduced;
detecting third network congestion;
in response to the detecting of the third network congestion, reducing the bit rate of an area of the frame having a priority level less than the highest priority level to a bit rate that corresponds to that of the second part of the frame.

2. The method of claim 1 wherein the first part contains more bits per macroblock than the second part.

3. A system comprising:
a sensitive-information generator to receive from a viewer of a video a definition of a first part of a frame that contains sensitive information, wherein the frame includes the first part and a second part, the viewer having defined the first part on the video through a graphical user interface, the sensitive information generator to additionally receive from the viewer different sensitive information priority levels for different areas of the frame identified by the viewer;
a transcoder to transcode the first part of the frame at a higher bit rate than the second part of the frame based on bandwidth available for transmitting the transcoded frame such that the transcoding further includes:
in response to the detecting of first network congestion, reducing the bit rate of the second part of the frame while maintaining the bit rate of the first part of the frame;
in response to the detecting of second network congestion, reducing the bit rates of the first and second parts of the frame wherein the bit rate of the second part of the frame is reduced more than the bit rate of the first part of the frame is reduced;
detecting third network congestion;
in response to the detecting of the third network congestion, reducing the bit rate of an area of the frame having a priority level less than the highest priority level to a bit rate that corresponds to that of the second part of the frame.

4. The system of claim 3 further comprising:
memory to store a configuration file including a coordinate of the first part of the frame.

5. The system of claim 3 further comprising:
a file analyzer to convert a format of the configuration file into another format compatible with the transcoder.

6. The system of claim 3 wherein the sensitive-information generator sends the definition of the first frame to the transcoder and receives a status of the bandwidth from the transcoder.

7. A computer-readable storage medium but not transitory electromagnetic signals having instructions therein which when executed with logic circuitry on a semiconductor chip cause a method to be performed, the method comprising:
receiving from a viewer of a video, a definition of a first part of a frame that contains sensitive information, said definition made by said viewer on said video through a graphical user interface, wherein the frame includes the first part and a second part, and additionally receiving from the viewer different sensitive information priority levels for different areas of the frame identified by the viewer;
transcoding the first part of the frame at a higher bit rate than the second part of the frame based on bandwidth available for transmitting the transcoded frame such that the transcoding further includes:
detecting first network congestion;
in response to the detecting of the first network congestion, reducing the bit rate of the second part of the frame while maintaining the bit rate of the first part of the frame;
detecting second network congestion;
in response to the detecting of the second network congestion, reducing the bit rates of the first and second parts of the frame wherein the bit rate of the second part of the frame is reduced more than the bit rate of the first part of the frame is reduced;
detecting third network congestion;
in response to the detecting of the third network congestion, reducing the bit rate of an area of the frame having a priority level less than the highest priority level to a bit rate that corresponds to that of the second part of the frame.

8. The computer-readable storage medium of claim 7 wherein the first part contains more bits per macroblock than the second part.

* * * * *